United States Patent
Kakiuchi et al.

[15] 3,642,358
[45] Feb. 15, 1972

[54] FILM PRESSURE DEVICE FOR CARTRIDGE

[72] Inventors: Tokusaburo Kakiuchi; Hideaki Akiyama, both of Tokyo, Japan

[73] Assignee: Kabushiki Kaisha Ricoh, Ota-ku, Tokyo, Japan

[22] Filed: July 15, 1969

[21] Appl. No.: 841,748

[30] Foreign Application Priority Data

July 18, 1968 Japan.................................43/50780

[52] U.S. Cl..............................................352/227, 352/230
[51] Int. Cl..................................................G03b 1/48
[58] Field of Search..........................352/221–231, 72, 352/78

[56] References Cited

UNITED STATES PATENTS

| | | |
|---|---|---|
| 2,455,206 | 11/1948 | Wienke...................................352/227 |
| 2,149,218 | 2/1939 | Heinisch et al. ........................352/230 |
| 2,431,681 | 12/1947 | Barstow.................................352/229 |
| 2,526,647 | 10/1950 | Foster et al. .........................352/224 X |
| 2,903,953 | 9/1959 | Meixner..............................352/221 X |
| 3,240,550 | 3/1966 | Mitchell et al......................352/227 X |
| 3,250,586 | 5/1966 | Winkler..............................352/221 X |

*Primary Examiner*—Louis R. Prince
*Assistant Examiner*—Joseph W. Roskos
*Attorney*—Burgess, Ryan and Hicks

[57] ABSTRACT

A film pressure device for use in a cineprojector or camera having an insertable film cartridge. When the cartridge is inserted for projection or photographing, a gate plate forces a pressure plate against a bias spring so that the film is tightly pressed against the pressure plate. When the cartridge is displaced for rewinding, the pressure plate has projections which abut a wall of the cartridge so that the film can travel freely adjacent the pressure plate.

1 Claim, 2 Drawing Figures

INVENTORS
Tokusaburo Kakiuchi
Hideaki Akiyama
BY Burgess, Ryan & Hicks
ATTORNEYS

FILM PRESSURE DEVICE FOR CARTRIDGE

BACKGROUND OF THE INVENTION

The present invention relates to a film pressure device for film cartridge and more particularly to a film pressure device of the type permitting the free and smooth travel of the film especially when the film in the cartridge is rewound without applying the pressure so as to hold the film firmly against the pressure plate.

The film must be rewound after projection or photographing in case of a cartridge having two shafts (that is a cartridge which uses no endless film) for cartridge type cineprojectors or cameras. Generally, this rewinding is made at a higher speed in order to save time so that undesired resistance is exerted to the film when it is pressed against a stationary member such as a pressure plate or when it is traveled through a passage having a space substantially equal to a thickness of the film, so that the film including its perforations may be easily susceptible to damage. In order to solve this problem, various attempts have been made, but none has been successful because they are complicated in construction.

In view of the above, the primary object of the present invention is to provide a film pressure device for cartridges simple in construction and reliable in operation.

SUMMARY OF THE INVENTION

According to the present invention, a film pressure plate of a cartridge having two shafts and being adapted to be used in a cineprojector or camera extends across an aperture formed in the front wall of the cartridge, normally biased so as to be pressed against the front wall by means of springs and provided with four projections which contact with the stationary portions (the front wall) of the cartridge adjacent to the aperture, thereby providing between the pressure plate and the front wall of the cartridge a film passage having a sufficient space for permitting the free and smooth passage of film therethrough. When projected or photographed, the gate plate moves the pressure plate away from the front wall of the cartridge and presses the film against the pressure plate. Therefore, when projected or photographed, the flatness of the film passing through the gate is maintained with precision and the film may be pressed against the gate and pressure plates to such an extent that no undesired resistance is exerted to the film at a speed for projection or photographying. However, in case of rewinding of the film, it may be substantially released from both of the plates.

The above and other objects, features and advantages of the present invention will become more apparent from the following description of one illustrative embodiment thereof with reference to the accompanying drawing.

DESCRIPTION OF THE PREFERRED EMBODIMENT

Figure 1:
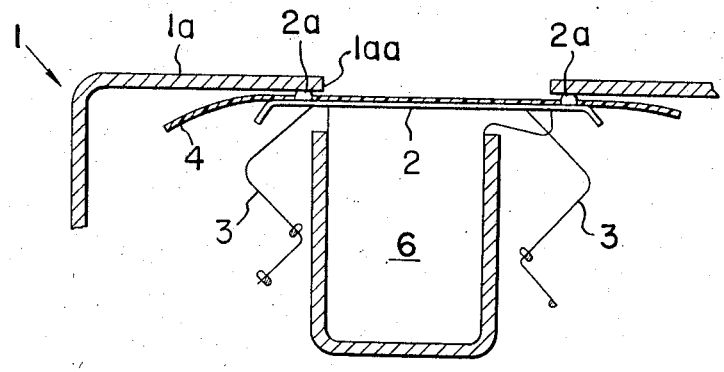
FIG. 1 is a segmental longitudinal sectional view illustrating a pressure plate device of a cartridge for a cartridge-type cineprojector, the film being rewound.
Figure 2:
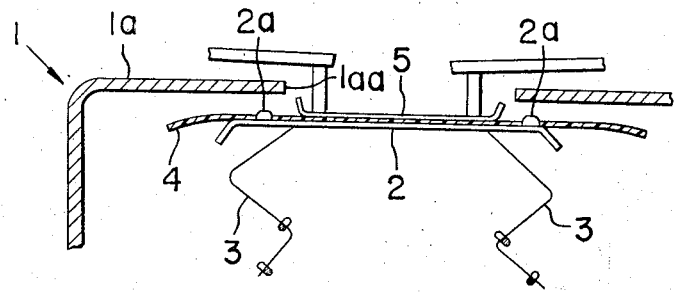
FIG. 2 is a view similar to FIG. 1 except that the film is being projected.

A cartridge 1 illustrated in the accompanying drawing is such that it has two operative or insertion positions. That is, when the cartridge is inserted into a cineprojector to the full extent, the cartridge is placed in projection position. On the other hand, when the cartridge 1 is pulled back a little from the projection position, the cartridge 1 is placed in rewinding position. The front wall 1a of the cartridge 1 has an opening 1aa and a film pressure plate 2 is pressed against the inner surface of the front wall 1a across the opening 1aa by means of springs 3. The pressure plate 2 is provided with four projections 2a (only two projections 2a being shown). The two projections 2a arranged in the direction perpendicular to the plane of the drawing are spaced apart from each other by a distance longer than the width of a film 4. The height of each projection 2a is made sufficiently higher than the thickness of the film 4. In the normal state and in case of rewinding, the pressure plate 2 is pressed against the inner surface of the front wall 1a by the springs 3, but the film 4 may pass freely in the space between the inner surface of the front wall 1a and the pressure plate 2.

When the cartridge 1 is inserted to its projection position, a gate or aperture plate 5 which is fixed to the projector and has a projection gate (not shown) is advanced into the cartridge 1 through the opening 1aa so that the gate plate 5 pushes back the pressure plate 2 through the film 4 to move away the projections 2a from the inner surface of the front wall 1a, whereby the film 4 is pressed against the gate plate 5 by the pressure plate 2. A movable reflecting mirror (not shown) is advanced into the space 6 behind the pressure plate 2 and the light from a light source is reflected by the mirror substantially by 90°, passes through the film 4, the gate aperture of the gate plate 5 and the projection lens (not shown) and is projected upon the screen (not shown).

From the foregoing, it is seen that upon insertion of the cartridge to a projection position, the film 4 is securely pressed against the gate plate 5 by the film pressure plate 2 so that the film being advanced may be correctly guided by the gate plate 5. Furthermore, the flatness of the film may be maintained with increased accuracy so that the image can be sharply focused upon the surface of the screen. When the cartridge 1 is retracted a little from the projection position to the rewinding position, the gate plate 5 is retracted from the cartridge 1 through the opening 1aa so that the pressure plate 2 may be advanced by the springs 3 and the projections 2a contact with the inner surface of the front wall 1a, thereby providing the relatively wide space or passage for the film therebetween. In this state, the film 4 may be rewound with less resistance so that the film including its perforations and sound track will not be damaged. Upon completion of rewinding, the cartridge 1 may be pulled out of the cineprojector or inserted again to the projection position.

So far the cartridge 1 has been described as being moved relative to the gate plate 5 which is securely fixed to the projector and is advanced into the cartridge so as to engage with the pressure plate 2, thereby securely guiding the film therebetween. But it will be understood that the same effect may be attained by the arrangement in which the gate plate 5 is moved relative to the cartridge 1 or both of the gate plate 5 and the cartridge 1 are moved so as to disengage from each other. It is also understood that the number of projections 2a of the pressure plate 2 is not limited to four as described above, but as many projections as desired may be provided. Furthermore, the sizes and configurations of the projections may be determined suitably as needs demand. The positions of the pressure plate may be held in the state as shown in FIG. 1 only when the film is rewound and it may be arranged so that the pressure plate is normally pressed slightly by lighttight means or the like. It is to be understood that the present invention may be applied to a cartridge for cinecameras in the similar manner as described above.

As the modification of the projections 2a, a pair of or a plurality of long rail-shaped projections may be provided.

We claim:

1. A pressure device for a film in a cartridge movable between a projection position and a rewind position and having a front wall with an opening therein and insertable in a cineprojector or camera having a gate plate fixed within said camera, comprising a pressure plate resiliently mounted in said cartridge, said pressure plate having at least four projections formed thereon, said projections spaced apart by a distance greater than the width of the film and having a height greater than the thickness of the film to allow the film to pass freely between said pressure plate and said front wall;

a spring mounted within said cartridge to abut said pressure plate for biasing said pressure plate toward said front wall;

said pressure plate displaced within said cartridge in projection position by pressing abutment thereagainst through said film by said gate plate passing through said opening between said projections, said pressure plate in said projection position spaced a predetermined distance from said front wall; and said pressure plate having its projections abut said front wall when said cartridge is displaced in the rewind position so that said gate plate is absent from said opening, the distance between said pressure plate and said inner wall being substantially less than said predetermined distance and being substantially equal to the height of said projections to allow the free passage of the film.

* * * * *